No. 723,950. PATENTED MAR. 31, 1903.
F. VAYDL.
GARDEN HOE.
APPLICATION FILED JULY 31, 1902.
NO MODEL.

Witnesses: Inventor:
John A. Miller Frank Vaydl

UNITED STATES PATENT OFFICE.

FRANK VAYDL, OF LAKE MARY, MINNESOTA.

GARDEN-HOE.

SPECIFICATION forming part of Letters Patent No. 723,950, dated March 31, 1903.

Application filed July 31, 1902. Serial No. 117,823. (No model.)

*To all whom it may concern:*

Be it known that I, FRANK VAYDL, a citizen of the United States, residing at the town of Lake Mary, Douglas county, and State of Minnesota, have invented a new and useful Improvement in Garden-Hoes for Hand Use, of which the following is a specification.

My invention relates to garden-hoes, and has for its object to construct a simple and efficient device for removing weeds and pulverizing the ground.

The novel construction employed by me in carrying out my invention is fully described and claimed in the specification and illustrated in the accompanying drawings, forming a part thereof, in which—

Figure 1:
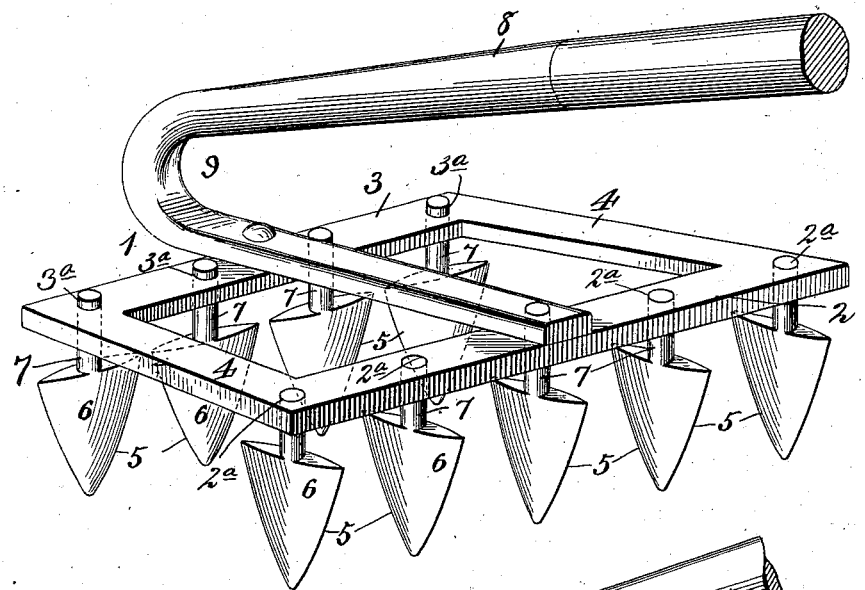
Figure 2:
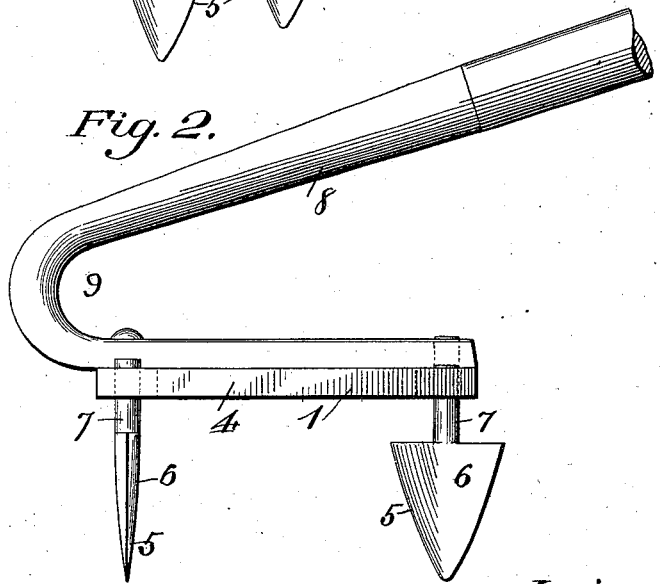

Figure 1 is a perspective of my hoe. Fig. 2 is a side elevation of the same.

Like numerals of reference designate like parts in both views of the drawings.

The numeral 1 designates a rectangular frame comprising a front bar 2, a rear bar 3, and two side bars 4. Mounted in apertures 2ª in the front bar 2 is a series of teeth 5, having spear-head-shaped bodies 6, bearing shanks 7, fitted in the apertures 2ª. The teeth 5 are set with their flat sides parallel to the direction of movement of the hoe in use—that is, parallel to the side bars 4. A set of teeth 5 are also mounted in apertures 3ª in the bar 3, but are set at right angles to the direction of the teeth 5, mounted in the bar 2—that is, their flat sides extend at right angles to the direction of the bars 4. A handle 8, having a bend 9 therein, is secured to the frame 1 to serve to operate the hoe in a direction parallel to the side bars. This arrangement of the two series of spear-shaped teeth makes an efficient tool for pulverizing the ground and removing the weeds.

I do not wish to be limited as to details of construction, as these may be modified in many particulars without departing from the spirit of my invention.

Having thus described my invention, what I claim as new, and desire to secure by Letters Patent, is—

1. In a hoe, the combination with a frame bearing a handle, of a series of spear-shaped teeth mounted in said frame and located with their flat sides parallel to the direction of movement of said hoe when operated, and a second set of spear-shaped teeth set with their flat sides at right angles to the direction of motion of said hoe when operated, substantially as described.

2. In a hoe, a rectangular frame having parallel front and rear bars, and a set of spear-shaped teeth mounted in each of said bars, substantially as described.

FRANK VAYDL.

Witnesses:
JOSEF TROUSIL,
H. JENKINS.